June 2, 1936. J. C. CARLIN 2,042,829
MACHINE FOR CUTTING RUBBER STOCK
Filed March 28, 1935 3 Sheets-Sheet 2
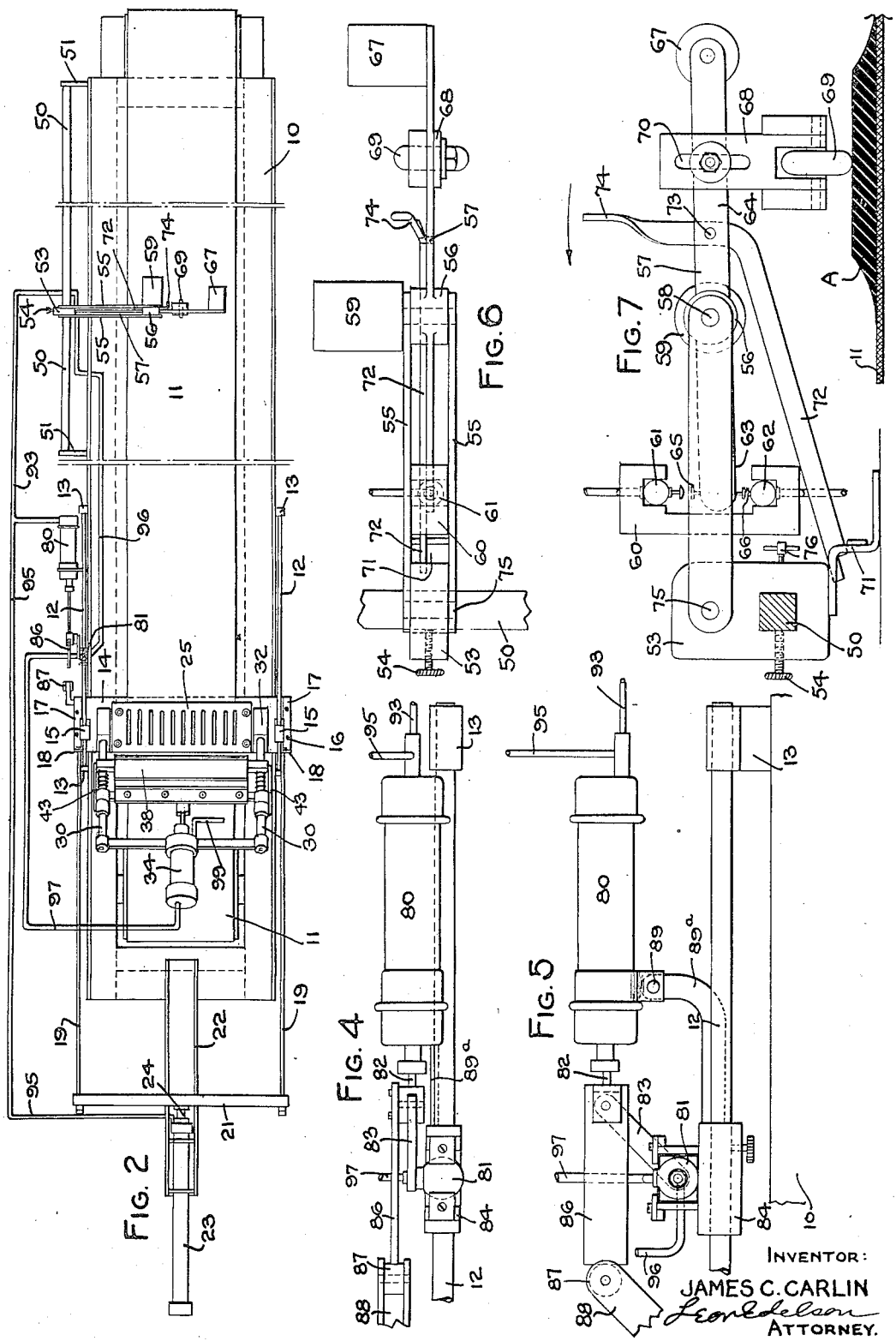
INVENTOR:
JAMES C. CARLIN
Leon Edelson
ATTORNEY.

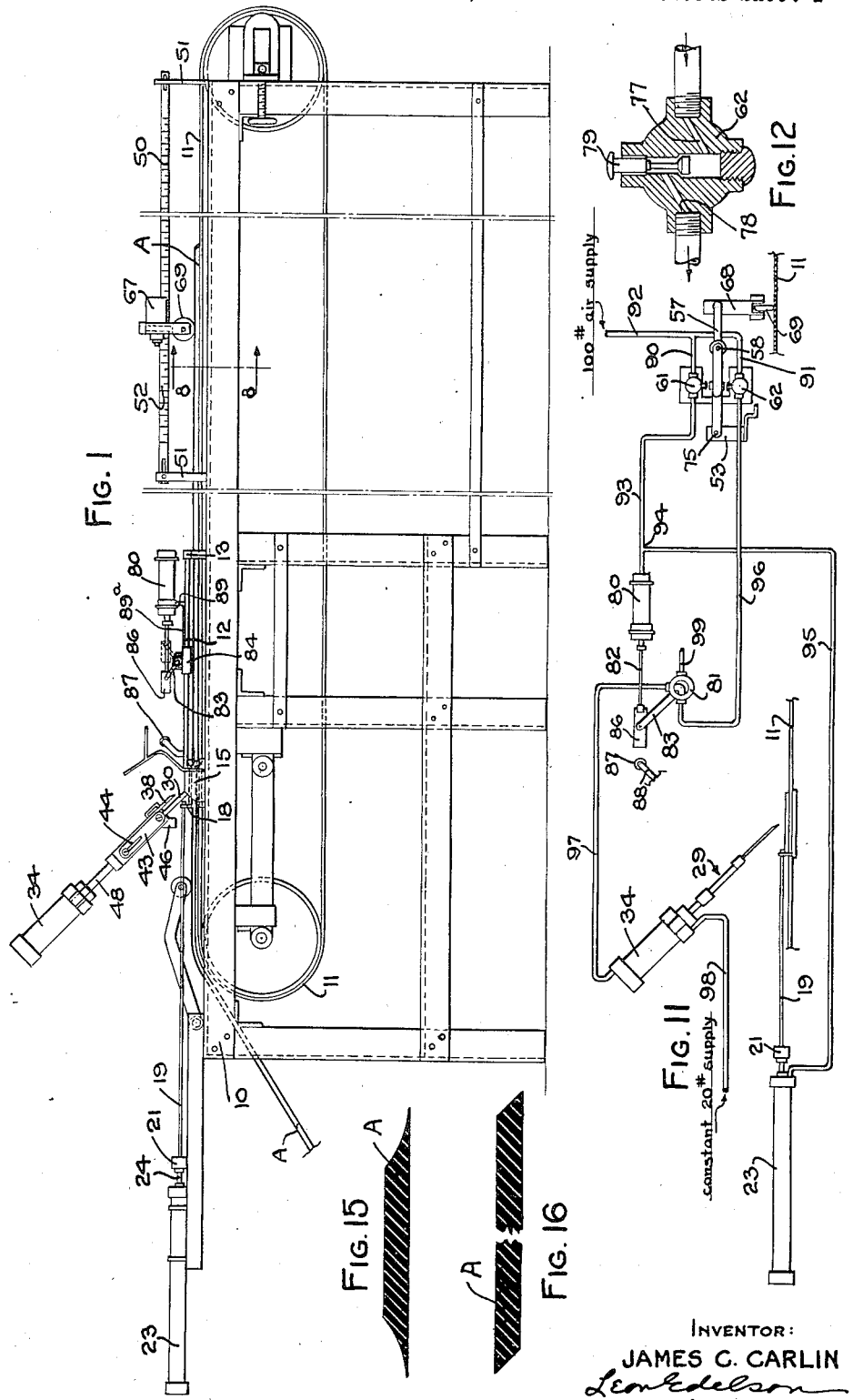

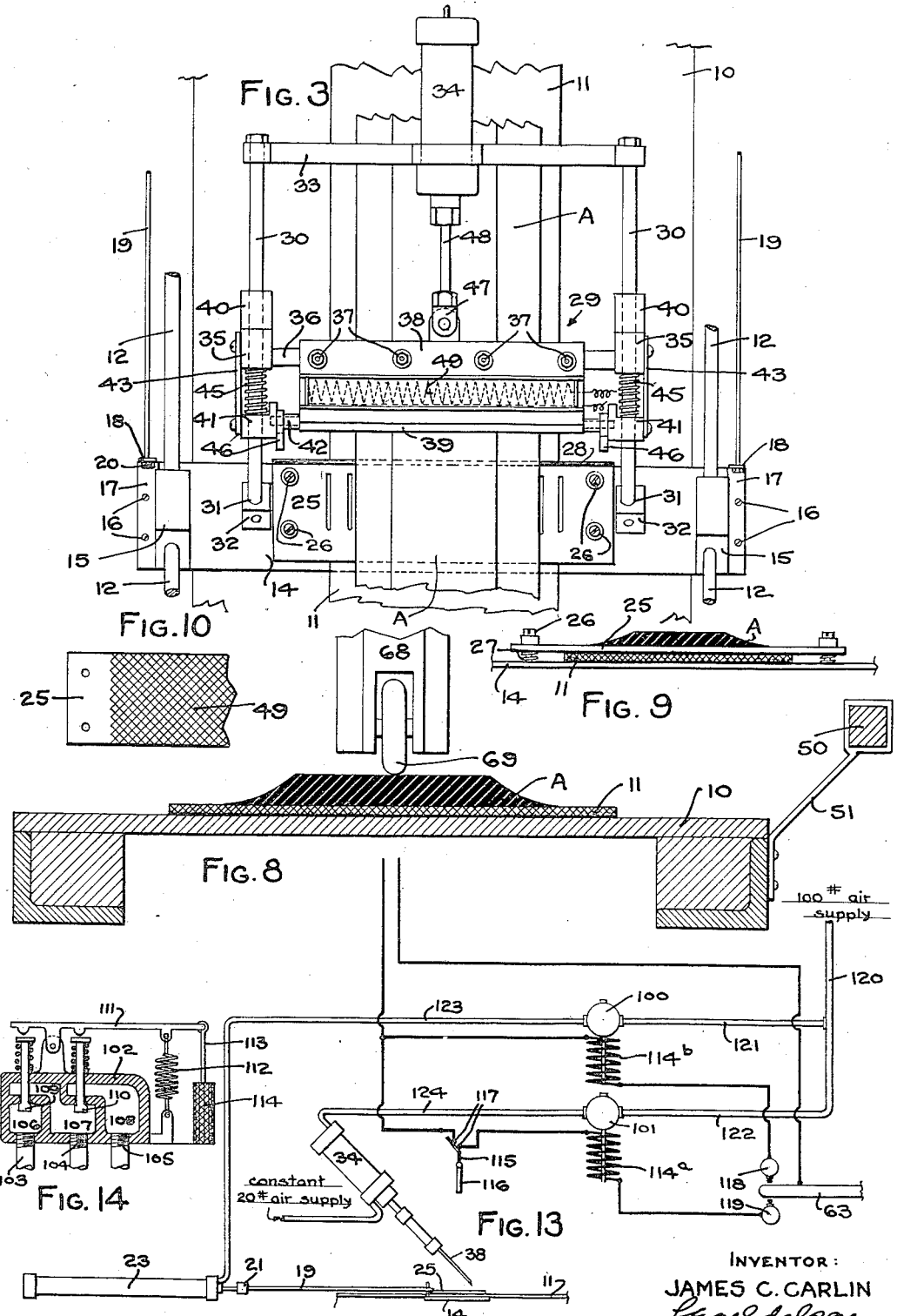

Patented June 2, 1936

2,042,829

UNITED STATES PATENT OFFICE 2,042,829

MACHINE FOR CUTTING RUBBER STOCK

James C. Carlin, Norristown, Pa., assignor to Lee Rubber & Tire Corporation, Conshohocken, Pa., a corporation of New York Application March 28, 1935, Serial No. 13,457

10 Claims. (Cl. 164—48)

This invention relates to improvements in machines for cutting rubber stock, and more particularly to a machine for uniformly and accurately cutting vehicle tread stock into tread strips of predeterminedly fixed length, the opposite ends of each strip being beveled during the cutting operation in such manner as to insure an accurate matching of the ends for splicing purposes.

Heretofore and prior to this invention, it has been the common practice in the art to manually cut the tread stock into the requisite length, the ends of each strip being beveled manually by the operator as he cuts the stock into strips. The cutting has usually been effected with the aid of a pair of scissors or a knife which the operator held at an angle to the plane of the stock to obtain the necessary bevel along the line of the cut. The strips so cut were then applied to the periphery of the tire casing in the operation of which the oppositely beveled ends of the tread strip were brought into overlapping relation for subsequent vulcanization under heat and pressure. The cutting of the tread strips manually in the manner just described was performed without the application of any heat to the cutting tool.

Obviously, the accuracy not only of the length of the tread strip but also of the bevel cut depended largely upon the skill of the operator and the care exercised by him during the cutting operation. And regardless of the skill of the operator and the care exercised by him, by manually cutting the tread stock with a cold tool it has been difficult, if not impossible, to insure against distortion in the cut ends of the tread strip. Moreover, the manual cutting of the tread stock into strips of requisite length, particularly when maximum care was employed to secure bevel cuts of uniform angular relation to the plane of the stock and in uniform planes extending at right angles to the length of the stock, was relatively expensive from the standpoint of the time consumed and the skilled labor required.

It is to avoid the foregoing objections and difficulties that the present invention has been developed, it being among the principal objects of the invention to provide an apparatus which is operative automatically to (a) accurately cut the tread stock into strips of predeterminedly fixed, uniform lengths; (b) to insure that the tread stock is uniformly cut along lines extending at right angles to the length of the stock; and (c) to insure that each transverse cut is always of the same angular relation to the horizontal plane of the tread stock, thereby insuring a more perfect matching of the cut ends of each tread strip than has been possible to obtain heretofore and prior to this invention.

Another important object of the present invention is the provision of apparatus including a heated cutting tool which is adapted to slice through the tread stock in such manner and at such a predeterminedly fixed angle as to lessen the tendency of the cut surface to "bloom" and at the same time eliminate the possibility of the stock being distorted along the line of the cut. The use of the heated cutting tool not only prevents "blooming" of the cut surface but also renders the said surface tacky and in ideal condition for splicing upon the application of a suitable solvent thereto.

Still another object of the invention ancillary to those stated above is the provision of an apparatus which is fully automatic in operation, thus requiring a minimum of operator attention; which increases the speed of production of the tread strips far beyond the speed possible under manual operating conditions; and which produces more uniformly accurate tread strips than has been possible to attain heretofore, thereby reducing very materially the number of strips which would otherwise have to be rejected due to nonstandard lengths of bevel-cut ends thereof.

A still further object of the invention is the provision of a movable carriage in which is operatively mounted the heated splicing blade and means operating in timed relation to the slicing movement of said blade for clamping the carriage to a continuously moving conveyor for the stock, thereby insuring against distortion of the stock along the cutting line as well as buckling thereof during the slicing operation, the arrangement being such as to permit the blade to advance in the same direction and at the same rate of travel as the stock to insure that the cut surface lies, in its entirety, in an absolutely flat plane extending angularly to the horizontal plane of the tread stock.

Other objects of the invention relating to details of construction and advantages of operation, such as the provision of a readily adjustable means for setting the machine to produce whatever length of tread strip may be desired, and the adaptability of the machine for operation under fluid pressure or electrically controlled valves for controlling the actuation of the several parts thereof, as well as the applicability of the machine for cutting tread stock of any width or contour without necessitating any adjustment of the machine except for setting the device for measuring the length of the strip desired to be produced, will appear more fully hereinafter.

The invention consists generally in the combination, construction, location and relative arrangement of parts, all as will be described hereinafter, as shown in the accompanying drawings, and as finally pointed out in the appended claims. While the drawings illustrate a machine particularly adapted to the cutting of tire tread strips, it is to be understood that a machine constructed in accordance with and embodying the principles of the present invention is equally applicable for use in the cutting into strips of predeterminedly fixed lengths any type of rubber or other such stock, as, for example, raw inner tube stock, stock for rubber flaps or for moulded goods of any description which is initially formed of a single length to be subsequently cut into shorter lengths.

In the accompanying drawings, which show a preferred embodiment of the present invention:—

Figure 1 is a side elevational view of the apparatus constructed in accordance with and embodying the principles of said invention;

Figure 2 is a top plan view of the apparatus;

Figure 3 is a view of the cutter mechanism and parts immediately associated therewith;

Figures 4 and 5 are enlarged top plan and side elevational views, respectively, of the mechanism for controlling the actuation of the cutter mechanism;

Figures 6 and 7 are enlarged top plan and elevational views, respectively, of the mechanism for controlling the operation of the apparatus as the stock to be cut is progressively fed therethrough;

Figure 8 is an enlarged cross-sectional view taken substantially along the line 8—8 of Figure 1;

Figure 9 is a cross-sectional view showing a part of the blade carriage clamped to the movable belt preliminary to the cutting operation;

Figure 10 is a partial view of the belt-engaging surface of the upper clamping plate;

Figure 11 is a diagrammatic view of an arrangement wherein a fluid operating medium is employed for actuating the apparatus, the circulation of the fluid medium being controlled mechanically;

Figure 12 is a sectional view of one of the control valves employed in the arrangement of Figure 11;

Figure 13 is a diagrammatic view of an alternative arrangement wherein the circulation of fluid operating medium is controlled electrically;

Figure 14 is a sectional view of one of the control valves employed in the arrangement of Figure 13; and Figures 15 and 16 are transverse and longitudinal views, respectively, of the stock cut to predetermined length by the apparatus of the present invention.

Referring now more particularly to the drawings, it will be observed that the apparatus includes a main supporting frame 10 upon which is mounted an endless belt conveyor 11 which is adapted to be continuously driven by any suitable prime mover, such as an electric motor (not shown). Preferably, the conveyor belt 11 is so arranged that the upper section thereof travels in a horizontal plane spaced slightly above the top surface of the frame 10, the belt being moreover of a length sufficient to accommodate upon the upper horizontal surface thereof the full length of any strip cut to predetermined length by the mechanism to be described hereafter. It will be understood, of course, that the material which is to be cut to length and provided with beveled ends is in the form of a continuous strip which is fed to and conveyed by the belt at a uniform rate of speed, which may be increased or decreased as desired to vary the output of the apparatus. This material is shown in the drawings to be rubber stock, designated by the reference character A, of the kind employed to form the tread body of a vehicle tire. Obviously, however, the apparatus is not limited to the cutting of tread stock alone but may be employed to cut to predetermined lengths material other than of the character illustrated.

As appears most clearly in Figures 1, 2, and 3, there is mounted upon the frame 10, toward its receiving end and at either side thereof, a horizontally disposed guide rod 12, each of these rods being held securely in position by brackets 13. Extending transversely of the frame 10 and immediately underlying the upper section of the conveyor belt 11 is a substantially flat plate 14 the opposite sides of which are provided with trunnions 15—15 through which are respectively projected the guide rods 12—12. The plate 14 is thus slidably supported by the rods 12—12 for movement longitudinally thereof in a plane lying immediately beneath the upper section of the conveyor belt.

Also secured to each side of the plate 14, as by screws 16 or the like, is a bracket 17 the rear end of which is upturned to provide a lug 18. Each of these latter lugs 18—18 is perforated to permit the projection therethrough of a rod 19 the outer end of which is provided with a nut 20 or otherwise headed to provide a loose connection between each rod 19 and one of the lugs 18. The rods 19—19 extend rearwardly of the main frame 10 of the apparatus, the rear extremities thereof being interconnected by a rigid cross-bar 21 to provide in effect a horizontally disposed U-shaped yoke for effecting the return of the plate 14 to its rearmost position, which is that shown in Figure 1.

Extending rearwardly from the frame 10 is an auxiliary frame 22 upon the rear end of which is supported a single-acting cylinder-and-piston unit 23, the piston rod 24 of which is secured to a central point of the cross-bar 21. It will be apparent that when a pressure medium, such as compressed air, is delivered to the cylinder in such manner as to cause the piston to move rearwardly of (i. e., away from) the frame 10, the cross-bar and its associated rods 19—19 will effect the return movement of the plate 14.

Resiliently supported above the plate 14 in substantially parallel relation thereto is a second plate 25 which is adapted to coact with the bottom plate 14 in a manner to be presently described to clamp the said plates against opposite surfaces of the moving conveyor belt 11. To this end, the upper plate 25 is supported by means of a plurality of studs 26 and intervening coiled compression springs 27 above the lower plate 14, the springs 27 serving normally to maintain the upper plate 25 in spaced relation with respect to the bottom plate. The normal elevation of the plate 25 above its supporting plate 14 is such as to permit the free passage between the plates of the conveyor belt 11. The spring pressed upper plate 25 is of a width considerably less than that of the bottom plate 14 although somewhat wider than the conveyor belt 11, all as appears most clearly in Figure 3. The said plate 25 being resiliently carried by the bottom plate 14 is, of course, movable with the latter longitudinally of the conveyor belt. Preferably, the plate 25 is provided with a beveled rear edge 28 to insure the free passage of the stock over the upper surface of said plate and forwardly of the apparatus.

Also carried by the transversely extending bottom plate 14 is a knife carriage, designated generally by the reference numeral 29. As appears most clearly in Figures 1 and 2, this knife carriage 29 is disposed in a plane inclined with respect to the horizontal in order that the rectilinearly movable knife thereof may shear through the rubber stock at a corresponding angle to the horizontal plane thereof. There is thus produced the beveled cut which is one of the objects of this invention. The knife carriage 29 generally consists of a pair of side rods 30—30, the lower ends of which are respectively secured, as at 31—31, to suitable blocks 32—32 fixed to and carried by the plate 14. These blocks 32—32 are respectively arranged immediately to either side of the upper, resiliently supported plate 25. Interconnecting the upper ends of the rods 30—30 is a rigid cross bar 33 within which is centrally supported a double-acting cylinder-and-piston unit 34. The rods 30—30 and the cross bar 33 constitute in effect a rigid U-shaped frame which is disposed in a plane extending at an angle to the horizontal.

Slidably mounted upon the inclined rods 30—30 are the sleeves 35—35 which are interconnected by a transversely extending cross bar 36. Secured to this cross bar 36, preferably by means of bolts 37, is a knife blade 38, the lower edge 39 of which is tapered to provide a sharp cutting edge. Immovably fixed to each of the inclined rods 30 is an abutment member 40 which serves to limit the permissible upward movement of the sleeves 35 along their respective guide rods 30. Also carried by each of the guide rods 30 in spaced relation to each sleeve 35 is a second sleeve 41, the sleeves 41—41 being interconnected by a transversely extending rod 42. This rod 42, which is preferably encased in one or more sleeves constituting rollers, serves a dual function in that it interconnects the sleeves 41—41 and also acts to prevent the stock from lifting with the knife upon completion of the cutting operation, as will appear more clearly hereinafter.

The sleeves 35 and 41 slidably mounted upon each of the rods 30 are loose-connected together by means of a slotted link 43. One of these links 43 is shown in side elevation in Figure 1 wherein it will be observed that it is provided with an elongated slot 44 for permitting a relative axial movement of the sleeve 35 toward the sleeve 41. Normally, the sleeves 35 and 41 are maintained in the spaced relation shown in Figure 3 by an intervening coiled compression spring 45. Carried by the transversely extending cross bar 42 which interconnects the pair of lowermost slots 41—41, are a pair of clamping members 46—46, these latter members being respectively arranged to press down upon the spring pressed plate 25 adjacent either end thereof. The function of these clamping members 46 will appear more fully hereinafter.

The transversely extending cross bar 36 upon which is mounted the knife blade 38 is connected, as at 47, to the piston rod 48 of the cylinder-and-piston unit 34. The knife blade itself is provided with an electrical heating element 49 of any conventional form whereby the knife blade is normally maintained at a predeterminedly regulated temperature.

In the operation of the cutter mechanism as just described, it will be understood that the stock to be cut is fed by any suitable means in the form of a continuous strip to and upon the conveyor belt 11, which latter in turn conveys the stock over the plate 25 and across the path of movement of the knife blade 38. Normally, the knife blade 38 is maintained in its raised position shown in Figures 1, 2 and 3. When a cut is to be made, the instant of which is controlled by the mechanism to be described hereinafter, the knife blade 38 is urged downwardly by the operation of the cylinder-and-piston unit 34 and slices through the stock. At the commencement of the downward stroke of the knife blade 38, the spring pressed plate 25 is in its upwardly pressed position, thus permitting the conveyor belt 11 to travel freely between the plates 14 and 25 without affecting their movement in one direction or another. However, as the knife blade continues its downward movement, the clamping members 46—46 are brought into engagement with the upper surface of the spring pressed plate 25 and exert a pressure downwardly upon said plate sufficiently to cause the belt 11 to be clamped securely between said plate 25 and its underlying plate 14.

Inasmuch as the belt continues its forward movement, when the clamping action aforesaid is effected the plates 25 and 14 move forwardly as a unit with the belt and consequently effect the forward movement of the knife carriage 29. The stock A, of course, continues its forward movement upon the conveyor belt. The clamping action is so timed in relation to the downward movement of the knife blade 38 along the inclined path of travel of the latter as to insure that the cut through the rubber stock is of such a character that every point of the cut surface lies in the same plane inclined with respect to the horizontal. At the same time, buckling of the rubber stock A behind the knife blade is prevented. These results are obtained by the clamping action of two plates 14 and 25 upon the conveyor belt, insuring as it does that the knife carriage is traveling forward at substantially the same rate of speed as the stock at the instant the latter is severed by the knife blade. It will be understood, of course, that the plate 25 lies beneath the rubber stock A along the line of the cut made by the knife blade and so prevents the latter penetrating beyond the stock and into the conveyor belt.

The coiled compression springs 45 which are arranged in intervening relation to the sleeves 35 and 41 which are slidable upon each of the inclined guide rods 30, serve a triple function. In the first place, these compression springs act as shock absorbers to absorb the shock of impact when the clamping members 46—46 strike against the plate 25. In the second place, these compression springs serve the important function of maintaining the plates 14 and 25 in clamping relation to the conveyor belt 11 for a slight interval after the cut has been made through the stock, this time interval being sufficient to permit the knife blade to be retracted from the stock prior to the complete release of the plate 25 from the belt. This important function of the compression springs is effected in the following manner. When the knife blade is in its lowermost position sufficient to effect the complete severance of the stock, the sleeves 35—35 are respectively in close proximity to the sleeves 41—41, in which condition the springs 45 are in their fully compressed state. As the knife blade 38 is withdrawn from its cutting position into the retracted position shown in Figure. 3, the compression springs 45 continue to exert sufficient pressure upon the sleeves 35 to maintain the clamping members 42 in clamping engagement with the plate 25, this pressure of the springs upon the sleeves 41—41 being exerted until the knife is fully withdrawn from the stock. It is only when the knife blade is fully retracted into its uppermost position shown in Figure 3 that the clamping members 42 are completely disengaged from the plate 25. A third function which may be stated for the coiled compression springs 45 is that they serve to initiate the return movement of the knife blade upon the completion of the cutting operation. The mechanism to effect this return will be described hereafter. Preferably, the bottom surface of the plate 25 is knurled, as at 49, to provide a more secure engagement with the belt (see Figure 10).

At this point reference is again made to the transversely extending cross-rod 42 which interconnects the sleeves 41—41. As the knife blade 38 returns to its raised position upon completion of its cutting stroke, the leading end of the unsevered portion of the stock A tends to lift with the knife. However, due to the fact that the upward movement of the cross-rod 42 lags slightly behind that of the knife blade, the continued upward lifting of the stock is interrupted by the cross-rod, which latter thus serves to hold down the stock until after the knife blade is fully retracted therefrom.

Mounted upon the conveyor frame 10 toward the discharging end of the conveyor belt 11 is the mechanism for automatically controlling the instant of operation of the cutting mechanism hereinbefore described. This controlling mechanism is termed the "length measuring control" because it functions to automatically insure the cutting of the rubber stock into strips of equal predetermined length. Generally, this length control mechanism includes a longitudinally extending rigid bar 50 the opposite ends of which are respectively supported by brackets 51—51 fixedly secured to the main frame 10. Preferably, the bar 50 is disposed to one side of and somewhat above the upper surface of the frame 10. Also, this bar, which is of non-circular cross-section, is suitably graduated, as at 52 (see Figure 1) to provide a linear scale to facilitate setting the apparatus to cut the stock into strips of a desired length.

Slidably mounted upon the graduated bar 50 is a carriage 53 which is adapted to be adjusted longitudinally in one direction or another along the said bar 50. A set screw 54 is provided for maintaining the carriage 53 in its adjusted position.

Pivotally secured to the carriage 53 and extending transversely across the path of movement of the conveyor belt 11 are a pair of arms 55—55. These arms are disposed in parallel relation and are adapted to receive between the outer ends thereof the central hub 56 of a lever 57. A pivot pin 58 commonly projects through the outer extremities of the arms 55—55 and the hub 56 of the lever in such manner that the said lever is free to oscillate upon the pivot pin 58. One end of the pivot pin 58 is provided with a laterally extending counterweight 59 which serves to urge the arms 55 downwardly. Also, carried by the said arms 55—55 is a mounting 60 within which are supported in any suitable manner a pair of valves 61 and 62 each of the character most clearly shown in Figure 12.

The valves 61 and 62 are respectively arranged above and below the horizontal plane of the arms 55—55. The pivoted lever 57 is formed with oppositely extending arms 63 and 64, the free extremity of the arm 63 being provided with oppositely disposed valve-actuating buttons 65 and 66 while the extremity of the lever arm 64 is provided with a counterweight 67. Adjustably supported upon the arm 64 of the pivoted lever is a roller mounting 68 within the bottom of which is journalled a roller 69 which is adapted to be engaged by the rubber stock as the latter is conveyed longitudinally along the conveyor belt. Preferably, the roller mounting 68 is provided with an elongated slot 70 therein by means of which the said mounting may be adjusted vertically relatively to its supporting arm 64 to adjust the control mechanism to different thicknesses of the stock to be cut to length.

The slidable carriage 53 is preferably provided with a depending keeper 71 with which is adapted to be engaged the lower end of a locking arm 72, this latter being pivoted, as at 73, to the arm 64 of the pivoted lever 57. The locking arm 72 is provided with an upstanding extension 74 adapted to be freely grasped by the operator of the apparatus who is ordinarily stationed upon the side of the apparatus opposite the graduated bar 50. In Figure 7 the locking arm 72 is shown disengaged from its keeper 71, it being understood that when the handle 74 of the locking arm is shifted in the direction of the arrow (see Figure 7), the lower extremity of the locking arm 72 engages its keeper 71 in consequence of which the arm 64 of the pivoted lever 57 is maintained in such raised position that the roller 69 is not engageable with the stock conveyed by the belt 11, the length measuring control being then inoperative.

While the roller is in such raised position, the arm 63 of its supporting lever 57 is necessarily depressed with the result that the valve 62 is opened at the same time that the valve 61 is closed. In Figure 7 the locking arm 72 is shown released from its keeper 71, the roller 69 being raised to the position shown by the engagement of the stock A therewith, as a result of which the weighted arm 64 of the pivoted lever 57 is raised sufficiently to cause the arm 63 of said lever to maintain the valve 62 closed and the valve 61 open. At this point it will be observed that with the apparatus arranged as in Figure 7 any upward force applied to the arm 64 of the lever 57 causes the said arm to raise as a unit with the arms 55—55 about the pivot 75 of the latter, this being due, of course, to the fact that the counter-clockwise movement of the lever 57 about its pivot 58 is restricted by the engagement of the button 66 against the valve 62.

Upon removal of the stock A from beneath the roller 69, the weighted arm 64 of the lever 57 immediately drops, in consequence of which the said lever rotates in a clockwise direction about its pivot 58 and so causes the upper button 65 of the lever arm 63 to engage and open the valve 61 at the same time that the corresponding lower button 66 is disengaged from and so permits the closing of the valve 62. The degree of angular rotation of the lever 57 in clockwise direction about its pivot pin 58 is limited by the permissible upward movement of the lever arm 63, while the corresponding clockwise movement of the said lever 57 and its supporting arms 55—55 as a unit about the pivot pin 75 is limited by an adjustable stop 76 which is carried by the sliding block 53. The adjustment stop 76 serves as an abutment which is engageable by the valve mounting 60, the said stop 76 being so adjusted that when it is engaged by the valve mounting 60 the roller 69 is spaced slightly above the upper surface of the conveyor belt 11. In other words, the adjustment is such that at no time is the roller 69 permitted to rest upon or contact the conveyor belt 11.

The valves 61 and 62 may be of any conventional form such as is shown, for example, in Figure 12 wherein it will be observed that the body of the valve 62 is provided with inlet and outlet ports 77 and 78 and a valve 79 which is normally maintained in such position as to close the valve against free communication between the inlet and outlet ports. The valve 61 is similarly constructed except that the inlet and outlet ports are oppositely inclined with respect to the corresponding ports of the valve 61 to insure opening of the valve when air under pressure is supplied to the inlet port. The valves are each of such construction as to permit the lines to which their outlet ports are respectively connected to exhaust to atmosphere by way of the valves when the latter are closed.

Mounted to one side of the frame 10 just in advance of the cutter mechanism is a single-acting cylinder-and-piston unit 80 with which is operatively associated a three-way valve 81 of any conventional type. As appears most clearly in Figures 2, 4 and 5, the valve 81 is connected to the piston rod 82 of the cylinder-and-piston unit by a link 83. Preferably, the valve 81 is supported in adjusted position upon the longitudinally extending side rod 12 by means of a mounting 84 which is slidable along the said rod and is adapted to be fixed in adjusted position by means of a set screw 85. The piston rod 82 is provided with an axially extending member 86 the free extremity of which is adapted for engagement by a cam roller 87 which is carried at the outer extremity of an arm 88 fixedly secured to and movable with the bottom plate 14 of the cutter mechanism. The cylinder-and-piston unit 80 is preferably pivotally supported, as at 89, upon a lateral extension or arm 89a secured to the mounting 84. With the parts arranged relatively as shown in Figures 4 and 5, that is, with the piston rod 82 in retracted position and the link 83 in the inclined position shown, the three-way valve affords a direct communication between the cylinder of the unit 34 and the atmosphere. In this position of the three-way valve 81 the cutter mechanism is in the position shown in Figure 3, that is, with the knife blade in its raised position.

Figure 11 is a diagrammatic representation of the fluid pressure circuit for operating the apparatus hereinafter described, it being understood that any suitable fluid pressure medium may be employed, preferably compressed air. As appears most clearly in Figures 2 and 11, the valves 61 and 62 have their inlet ports commonly in communication, by way of the flexible conduits 90, 91 and 92, with a suitable source of air pressure supply (not shown), preferably on the order of one hundred pounds. The outlet port of the valve 61 is connected to the cylinder 80 by a flexible conduit 93 which is tapped, as at 94, to supply air pressure to the cylinder 23 by way of the flexible conduit 95. The cylinders 80 and 23 are thus commonly connected to the source of air pressure supply by way of the valve 61.

The outlet port of the valve 62 is connected by way of the conduit 96 to the inlet of the three-way valve 81, the outlet of the latter being in turn connected to the top of the cylinder 34 by the flexible conduit 94. The lower end of the cylinder 34 is in communication by way of the conduit 98 with a supply of low pressure air, preferably on the order of twenty pounds pressure. The exhaust port 99 of the three-way valve directly communicates with the atmosphere.

In the operation of the apparatus, it will be assumed that the roller 69 of the length control mechanism has been fixed in adjusted position longitudinally of the graduated bar 50, thereby setting the apparatus to automatically cut the stock into strips of a predetermined length. This length equals the distance between the roller 69 and the point at which the cutter mechanism penetrates through the stock A. The stock A is then fed upon the conveyor belt 11 and traverses the plates 14 and 25 of the cutter mechanism. As the stock is initially fed upon the conveyor belt 11 and commences its movement forward along the upper section thereof, the operating lever 72 (see Figure 7) is disengaged from its keeper 71 thereby permitting the roller to drop to a point just above the surface of the conveyor belt. As was mentioned hereinbefore, the normal elevation of the roller above the belt is determined by the adjustment of the stop 76 which is carried by the sliding block 53 and is adapted to be engaged by the valve mounting 60. In this lower position of the roller 69 the valve 62 is closed while the valve 61 is open, this condition of these valves being obtained by the action of the pivoted lever 57 as described above. At the same time the cutter mechanism is in the position shown in Figure 3, that is, with the knife blade 38 thereof in its raised position at the same time that the plate 14 upon which the cutter mechanism is supported is in its rearmost position. In this condition of the apparatus the compressed air is delivered from the main source of supply through the valve 61 to the cylinder 80 and to the cylinder 23. The air pressure thus delivered to the cylinder 80 forces its piston outwardly to thereby throw the three-way valve into the position shown in Figure 11, in which position the conduits 96 and 97 are in communication with each other. At the same time, the air pressure which is delivered to the cylinder 23 causes the piston thereof to be retracted which in turn retracts the cutter mechanism as a unit into its inoperative position shown in Figures 2 and 3.

As the rubber stock A continues to advance along the conveyor belt 11 its leading end engages the roller 69 and causes the latter to lift into the position shown in Figure 7. Immediately as the roller 69 is lifted, the pivoted lever 57 is oscillated about its pivot 58 to such extent that the arm 63 of the lever operates to open the valve 62 at the same time permitting the valve 61 to close. The air pressure from the main source of supply is thereupon delivered by way of the conduit 96, the valve 81 and the conduit 97 to the top of the cylinder 34, as the result of which the piston of the latter acts upon the cross bar 36 to effect the actuation of the cutter mechanism in the manner hereinbefore described. At the same time that the pressure medium is delivered through the conduits 96 and 97 to the cutter actuating cylinder 34, the cylinders 80 and 23 are permitted to exhaust to atmosphere by way of the valve 61.

From the description of the operation of the cutter mechanism as given earlier in this specification, it will be understood that as the knife blade is shifted downwardly into cutting position the spring pressed plate 25 coacts with the bottom plate 14 to clamp the belt 11 therebetween. Due to the belt being clamped between the plates 25 and 14, the latter are caused to move forwardly with the belt in consequence of which the cam roller 87, which is carried by and extends somewhat forwardly of the plate 14, engages the member 86 (see Figures 4 and 5), and so resets the three-way valve 81 into the position shown in Figure 5. In this reset position, the three-way valve 81 closes the communication between the conduits 96 and 97 at the same time that it opens the conduit 97 to the atmosphere. The cutter-actuating cylinder 34 is thus exhausted to atmosphere immediately as the cutter reaches the limit of its cutting stroke. The twenty pound pressure to which the lower end of the piston 34 is constantly subjected is sufficient to effect the retraction of the cutter mechanism into its inoperative position shown in Figure 3.

It will be understood from the foregoing that as soon as the rubber stock A has been penetrated by the knife 38 of the cutter mechanism, the valve 81 is automatically reset into its position shown in Figure 5, in which position this valve is closed to the free passage of air from the high pressure supply source to the cylinder 34. So long as the strip of stock thus cut to length continues to be fed along the conveyor belt beneath the roller 69 the valves 61 and 62 respectively remain closed and open. However, upon removal of the cut strip of stock from the conveyor belt, the roller 69 immediately drops in consequence of which a reverse operation of the valves 61 and 62 takes place, the valve 61 being opened while the valve 62 is closed. As a result, the high pressure supply of air is again delivered to the cylinders 80 and 23, the former cylinder operating to set the valve 81 for subsequent delivery of the high pressure air supply to the cylinder 34 while the latter cylinder operates to retract the cutter mechanism into its inoperative position. The cycle of operation is then repeated in the manner hereinbefore described.

In the arrangement just described, the valves 61, 62 and 81 are all mechanically actuated. In Figure 13 is diagrammatically illustrated an arrangement in which only two valve units are employed and wherein these valve units are actuated electrically. These valve units, which are designated by the reference numerals 100 and 101, are preferably of the type shown in Figure 14. Each valve is provided with a main body 102 having an inlet 103, and an outlet 104, and an exhaust 105. The valve body is internally partitioned to provide the chambers 106, 107 and 108. Valves 109 and 110 respectively control the communication between the chambers 106 and 107 and between the chambers 107 and 108. The valves 109 and 110 are spring pressed and normally assume closed positions. Pivotally carried upon the valve body is a lever 111, the outer end of which is normally maintained in depressed condition by a coiled compression spring 112. When the lever is depressed by the action of the spring 112, the valve 110 is opened while the valve 109 is closed. To effect a reverse operation of these valves, the lever 111 is subjected to the action of the plunger 113 of an electromagnet 114, the arrangement being such that upon energization of the electromagnet, the lever is lifted against the action of the spring 112 to open the valve 109 at the same time permitting the valve 110 to close.

In place of the three-way valve 81 of Figure 11 and its operating cylinder 80 and associated parts, in the arrangement of Figure 13 a pivoted switch 115 is employed, the arm 116 being weighted or spring pressed to normally bridge the contacts 117. In place of the valves 61 and 62 of the arrangement shown in Figure 11, in the arrangement of Figure 13 a pair of electrical contacts 118 and 119 are employed between which is disposed the outer extremity of the arm 63 of the pivoted lever 57 (see Figures 6 and 7).

The compressed air from the high pressure supply (not shown) is delivered by way of the conduits 120, 121 and 122 to the inlets 103 of each of the valve units 100 and 101. The outlet 104 of the valve 100 is connected by way of a conduit 123 to the cylinder 23, while the corresponding outlet of the valve unit 101 is connected by the conduit 124 to the upper end of the cylinder 34. When the roller 69 (see Figure 7) is in its raised position, as when engaged by the stock A, the arm 63 contacts the terminal 119 and so completes the electrical circuit through the electromagnet 114a which is operatively associated with the valve unit 101. This electromagnet is accordingly energized and so opens the valve 109 thereby permitting the free delivery of the high pressure fluid through the valve unit 101 directly to the cylinder 34, in consequence of which the cutter mechanism is immediately actuated. As the cutter mechanism completes its cutting operation, the cam roller 87 (see Figure 5) engages the arm 116 of the switch 115 and opens the circuit through the electromagnet 114a. As a result, the valve 106 is closed and the valve 107 is opened, thereby permitting the compressed air within the cylinder 34 to exhaust to atmosphere by way of the exhaust outlet 105.

Upon removal of the strip of stock from the conveyor belt, the roller 69 drops, in consequence of which the arm 63 electrically contacts the terminal 118, thereby completing the electrical circuit through the electromagnet 114b which is operatively associated with the valve unit 100. A high pressure supply is then permitted to pass freely, by way of the conduits 121 and 123, to the return cylinder 23, thereby effecting the return of the cutter mechanism and associated parts into its inoperative position. Simultaneously with this last operation, the switch 115 is permitted to return to its circuit-closing position shown in Figure 13, thereby conditioning the apparatus for a further cutting operation immediately that the leading end of the next strip to be cut engages beneath and so raises the roller 69. Of course, lifting of the roller 69 interrupts the circuit through the electromagnet 114b and so effects de-energization of the latter with the result that the valve unit 100 is actuated to permit air from the cylinder 23 to be exhausted to atmosphere. In all other respects, the arrangement of Figure 13 operates similarly to the arrangement of Figure 11.

Of course, it will be understood that various other arrangements may be employed for effecting the automatic actuation of the valve units 100 and 101 in an arrangement such as is illustrated in Figure 13. For example, photo-electric cells may be employed in such manner that the roller and its associated parts may be entirely dispensed with, the operation of the valve units 100 and 101 (see Figure 13) being controlled by the stock intercepting a light beam which is arranged to influence the photo-electric cell. In such an arrangement, as the stock intercepts the said light beam the photo-electric cell would operate to actuate the electromagnet 114a. On the other hand, removal of the severed strip of stock from the conveyor belt would permit the photo-electric cell to be influenced by the light beam in such manner as to effect the deenergization of the electromagnet 114a and the corresponding energization of the electromagnet 114b. The electrical circuit for effecting this photo-electric cell control of the valve units 100 and 101 has not been illustrated because it is believed that the principles thereof are well understood by and known to those skilled in the electrical art.

Figure 16 is a longitudinal sectional view of a strip cut to predetermined length by the apparatus of the present invention. It will be observed that this strip is provided with beveled ends B—B, the inclination of which with respect to the horizontal is determined by and corresponds to the inclination of the reciprocable knife blade 38. Due to the fact that the knife blade is heated, the stock, along the transverse line of severance, is not distorted as would be the case were a cold knife employed. Moreover, the heated knife lessens the tendency of the cut surface of the rubber stock to "bloom", at the same time that it renders the surface in ideal condition for splicing. In addition to the foregoing, the apparatus is operative automatically to insure that the strips are cut accurately to a predetermined length, that the beveled end surfaces B—B (see Figure 16) are all uniformly flat throughout their entire extents and lie in planes uniformly inclined with respect to the plane of the stock, and that the inclined plane of each beveled end surface extends at right angles to the longitudinal edges of the stock. By so insuring against variations in the beveled end surfaces, the latter match perfectly and so produce a neater, stronger and more perfect splice.

Obviously, the invention is subject to various other changes and modifications without departing from the general principles or real spirit of the invention and accordingly it is intended, in the appended claims, to define the invention broadly as well as specifically.

What is claimed as new and useful is:—

1. An apparatus for cutting rubber stock and the like comprising, in combination, a continuously moving conveyor for the stock to be cut, a cutting member adapted to sever the stock along a line extending transversely thereof, means operative automatically to actuate said cutting member when a predetermined length of stock has been conveyed by said conveyor forwardly of said line of severance, and means for preventing lifting of said stock upon removal of the cutting member therefrom.

2. An apparatus of the character defined in claim 1 wherein the said means for retaining the stock against lifting is rendered effective upon the actuation of the cutting member and for a period commencing just prior to actual engagement of the stock by the said cutting member and ending just after the latter has been fully retracted from the stock.

3. An apparatus for cutting rubber stock and the like to length comprising, in combination, means for continuously conveying the stock to be cut, a cutting member operatively disposed above the path of movement of said stock and adapted to be depressed to sever the latter into equal length strips, a fluid-pressure operated means for actuating said cutting member, and means governed by the length of stock which has advanced forwardly of said cutting member for controlling the supply of fluid pressure medium to said actuating means for the cutting member.

4. An apparatus for cutting rubber stock and the like comprising, in combination, means for continuously conveying the stock to be cut, a cutting member operatively disposed across the path of movement of said stock and adapted to be depressed to sever the latter into strips of predetermined length, a fluid-pressure operated means for actuating said cutting member, means operable automatically upon the passage of a predetermined length of stock forwardly of said cutting member to supply a fluid pressure medium to said actuating means for the cutting member, and means operable automatically and simultaneously as the stock severing operation is completed to interrupt the supply of the fluid pressure medium to said actuating means.

5. An apparatus of the character defined in claim 4 wherein upon interruption of said fluid-pressure medium supply to the said cutter actuating means, the pressure medium remaining in said latter means is vented to atmosphere simultaneously as a separate supply of fluid-pressure medium is rendered effective to retract the cutting member into inoperative position.

6. An apparatus for cutting rubber stock and the like comprising, in combination, means for continuously conveying the stock to be cut along a path traversing a cutting member, a cutting member operatively disposed with respect to said moving stock and adapted to be depressed to sever the latter into strips of predetermined length, a fluid-pressure operated means for actuating said cutting member, a main source of fluid-pressure medium supply adapted for delivery to said actuating means, and a valve operated by the length of stock traversing the cutting member for controlling the delivery of the fluid pressure medium from said supply to said actuating means.

7. An apparatus for cutting rubber stock and the like comprising, in combination, means for continuously conveying the stock to be cut along a fixed path of movement, a cutting member operatively disposed across the path of movement of said stock and adapted to be depressed to sever the latter into strips of predetermined length, a hold-down member operative to retain the stock against vertical displacement from said path of movement during the return stroke of the cutting member, a fluid-pressure operated device for actuating said cutting member, and means governed by the movement of said stock along the said fixed path to control the supply of the fluid pressure medium to said operating device.

8. An apparatus for cutting rubber stock and the like to length comprising, in combination, means for continuously conveying the stock to be cut, a cutting member operative to sever the stock along a predeterminedly fixed transverse line, said cutting member being arranged for rectilinear movement in a plane extending angularly to the plane of the stock, means for advancing said cutting member in a direction paralleling the plane of the stock at the same rate of travel as the stock during the period of penetration of the stock by the cutting member, and stock hold-down means operative during the period required for the cutting member to be fully withdrawn from the severed stock.

9. An apparatus for cutting rubber stock and the like into strips of predetermined length comprising, in combination, a continuously moving conveyor for the stock and a cutting element normally arranged above the stock and adapted to be depressed to sever the stock along a line extending transversely thereof, means operative automatically by the movement of the stock to actuate said cutting element when a predetermined length of stock has been conveyed by said conveyor beyond said line of severance, and means for heating the cutting element to a predetermined temperature.

10. An apparatus for cutting rubber stock and the like limber material into strips of predetermined length comprising, in combination, a continuously moving uninterrupted conveyor upon which the stock is supported and conveyed through the apparatus, a cutting element normally arranged above the stock and adapted to be depressed to sever the stock along a line extending transversely thereof, means operative automatically by the movement of the stock to actuate said cutting element when a predetermined length of stock has been conveyed by said conveyor beyond said line of severance, said conveyor being operative to convey the severed length of stock forwardly beyond the line of severance, and means for heating the cutting element to a predetermined temperature.

JAMES C. CARLIN.